No. 754,165. PATENTED MAR. 8, 1904.
D. A. RIPLEY.
MANUFACTURE OF GLASS ARTICLES OF CIRCULAR CROSS SECTION.
APPLICATION FILED OCT. 19, 1903.
NO MODEL. 2 SHEETS—SHEET 1.
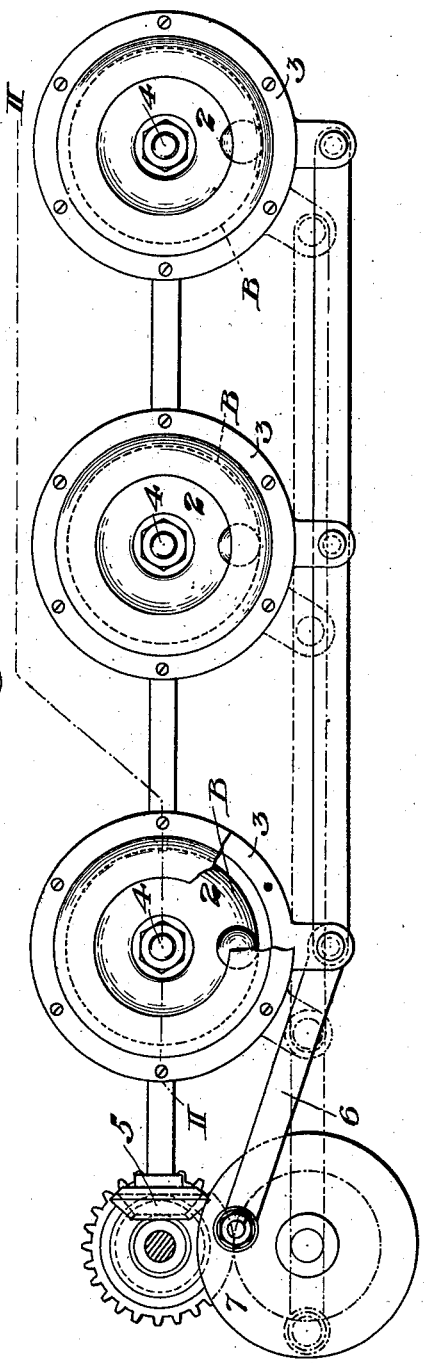
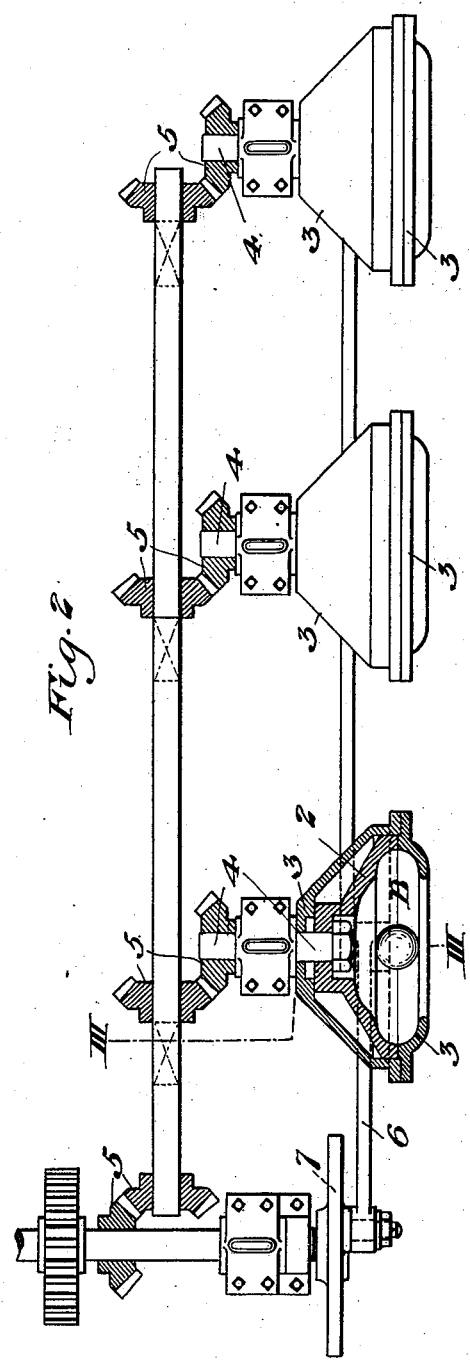
WITNESSES
Geo. W. Blair
Daniel C. Ripley
INVENTOR
Daniel A. Ripley No. 754,165. PATENTED MAR. 8, 1904.
D. A. RIPLEY.
MANUFACTURE OF GLASS ARTICLES OF CIRCULAR CROSS SECTION.
APPLICATION FILED OCT. 19, 1903.
NO MODEL. 2 SHEETS—SHEET 2.
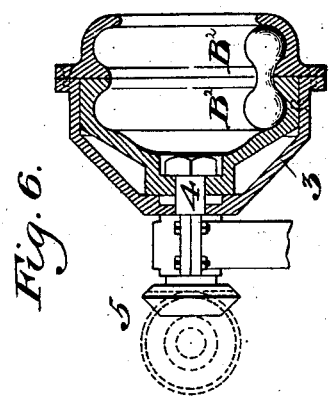
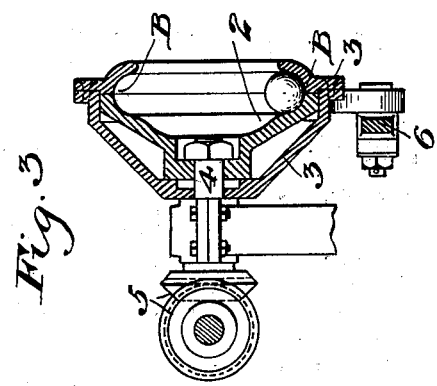
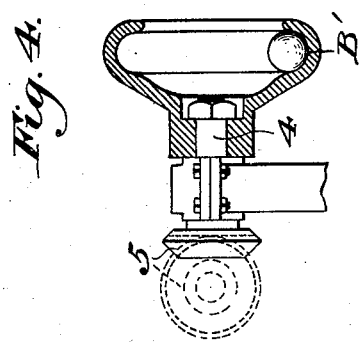
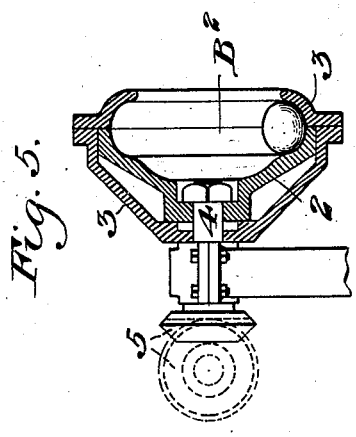
WITNESSES
Geo W Blair
Daniel C Ripey
INVENTOR
Daniel A. Ripley
THE NORRIS PETERS CO., PHOTO-LITHO., WASHINGTON, D. C.

No. 754,165. Patented March 8, 1904.

UNITED STATES PATENT OFFICE.

DANIEL A. RIPLEY, OF PITTSBURG, PENNSYLVANIA, ASSIGNOR TO UNITED STATES GLASS COMPANY, OF PITTSBURG, PENNSYLVANIA, A CORPORATION OF PENNSYLVANIA.

MANUFACTURE OF GLASS ARTICLES OF CIRCULAR CROSS-SECTION.

SPECIFICATION forming part of Letters Patent No. 754,165, dated March 8, 1904.

Application filed October 19, 1903. Serial No. 177,561. (No model.)

*To all whom it may concern:*

Be it known that I, DANIEL A. RIPLEY, of Pittsburg, Allegheny county, Pennsylvania, have invented a new and useful Improvement in the Manufacture of Glass Articles of Circular Cross-Section, of which the following is a full, clear, and exact description, reference being had to the accompanying drawings, forming part of this specification, in which—

Figure 1 shows a group of connected machines suitable for the practice of my invention. Fig. 2 is a plan view, partly in horizontal section, on the line II II of Fig. 1. Fig. 3 is a vertical section on the line III III of Fig. 2. Figs. 4, 5, and 6 are sectional views of modified constructions of the apparatus.

My invention relates primarily to the manufacture of glass balls or spheres which are largely used in the arts in the manufacture of furniture-casters and for other purposes. Difficulty has been experienced heretofore in making such balls accurately spherical. My invention enables them to be made cheaply and quickly and with great accuracy of shape, thus improving their quality and diminishing their cost.

In Figs. 1, 2, and 3 of the drawings, which illustrate the preferred construction of my apparatus, B is a rotary or oscillatory open-grooved forming concave surface, which is in cross-section an arc of the circle and preferably about one-half a circumference. This surface is preferably formed by two independently-movable annular parts 2 and 3, capable of being rotated or oscillated independently of each other. The part 2 is mounted on a shaft 4, which is driven by gearing 5 continuously in a single direction, and the part 3 is attached to an arbor which is fitted upon the shaft and is oscillated, by means of a pitman 6, from a crank 7. A number of the machines are preferably arranged side by side, as shown in Figs. 1 and 2, so that a single pitman and driving-crank will serve to oscillate the parts of all the machines simultaneously.

In the operation of the machine I make a gathering of glass of the proper size and preferably as nearly spherical as may be convenient and place it within the forming-groove B through the open end of the machine. One side, 2, of the forming-groove is rotated continuously, and the other side, 3, oscillates so that the piece of glass is turned thereby over and over, and without substantial lateral pressure every part of the glass is subjected by gravity to the forming action of the groove, by which it is quickly brought to spherical shape. When it is cooled sufficiently to become set, it is removed and another gathering of glass substituted.

Instead of having the forming-groove made of two independently rotary parts I may make it of a single rotary or oscillatory part, as shown at B' in Fig. 4. In this case, however, the mass of glass does not so frequently change its points of contact with the forming-groove, and I am unable to obtain such accurate spherical form as by the mechanism described above.

In the modification shown in Figs. 5 and 6 I show the application of my invention to the manufacture of articles circular in cross-section other than spheres. For this purpose instead of making the groove $B^2$ of circular outline I make it to correspond in contour to the article to be formed and make it of a single integral part instead of two parts, as in Figs. 1 and 2. Thus in Fig. 5 the groove is shaped to make an oval article and in Fig. 6 it is shaped to make an article having the shape of a dumb-bell.

The skilled mechanic will be able to modify the apparatus in various ways, since my invention consists in the method of making glass balls and other glass articles of circular cross-section, wherein a plastic mass of glass is supported on and subjected to rolling contact in a forming-surface of the desired contour.

I claim—

1. The method herein described of making glass articles of circular cross-section, which consists in supporting a piece of plastic glass upon a forming-surface of the desired contour, retaining it in contact with said surface by gravity only, and subjecting it to rolling contact therewith; substantially as described.

2. The method herein described of making glass balls, which consists in supporting a piece of plastic glass upon a divided forming-surface of the desired contour, subjecting it to continuous rolling in contact with a portion of said surface and to an intermittent rolling in contact with the other portion of said surface; substantially as described.

3. The method herein described of making glass balls, which consists in retaining by gravity a piece of plastic glass in contact with a divided forming-surface of the desired contour, subjecting it to unidirectional rolling contact with one portion of said surface and to rolling contact in alternately reverse directions with the other portion of said surface; substantially as described.

In testimony whereof I have hereunto set my hand.

DANIEL A. RIPLEY.

Witnesses:
THOMAS W. BAKEWELL,
GEO. W. BLAIR.